US 6,552,470 B2

(12) United States Patent
Hodar

(10) Patent No.: US 6,552,470 B2
(45) Date of Patent: Apr. 22, 2003

(54) PIEZOELECTRIC MOTOR

(75) Inventor: Francois Hodar, Orsay (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 10/050,592

(22) Filed: Jan. 16, 2002

(65) Prior Publication Data
US 2002/0113522 A1 Aug. 22, 2002

(30) Foreign Application Priority Data
Jan. 17, 2001 (FR) ............................. 01 00601

(51) Int. Cl.$^7$ ................................................. H02N 2/00
(52) U.S. Cl. .................. 310/317; 310/323.02; 310/328
(58) Field of Search ........................... 310/317, 323.02, 310/323.04, 323.09, 328

(56) References Cited

U.S. PATENT DOCUMENTS

| | | | | |
|---|---|---|---|---|
| 4,888,515 A | * | 12/1989 | Tamura | .................. 310/323.02 |
| 5,986,383 A | * | 11/1999 | Hasuda et al. | ............... 310/317 |
| 6,060,816 A | | 5/2000 | Audren | .................. 310/323.02 |
| 6,204,590 B1 | * | 3/2001 | Audren et al. | ......... 310/316.01 |
| 6,429,573 B2 | * | 8/2002 | Koopmann et al. | ......... 310/328 |

FOREIGN PATENT DOCUMENTS

| | | | | |
|---|---|---|---|---|
| EP | 0 297 574 | 1/1989 | ........... H01L/41/08 |
| GB | 1 572 050 | 7/1980 | ........... H01L/41/08 |

* cited by examiner

*Primary Examiner*—Thomas M. Dougherty
(74) *Attorney, Agent, or Firm*—Harness, Dickey & Pierce, P.L.C.

(57) ABSTRACT

The invention relates to a piezoelectric motor having a rotor and supply means ($S_0$, $S_1$) for supplying an electrical control voltage to at least one piezoelectric element (9) of the stator. According to the invention, the supply means ($S_0$, $S_1$) are arranged to supply an electrical control voltage having a DC component ($V_0$) for shifting towards the expansion state of the piezoelectric elements (9).

14 Claims, 2 Drawing Sheets

PIEZOELECTRIC MOTOR

BACKGROUND AND SUMMARY OF THE INVENTION

The present invention relates to a piezoelectric motor. One field of application of the invention is aircraft actuators.

Such electric motors are intended to replace conventional electromagnetic motors, since the latter generate electromagnetic interference which interferes with the avionics and the electrical control devices of the aircraft. Such piezoelectric motors of the PZT type are known with small powers, about a few watts. These motors generate a high torque and a low speed of around 100 revolutions per minute. However, they are not suitable for higher powers of around several kilowatts, the heating at these powers being very high and destructive. In fact piezoelectric materials, beyond a certain temperature, lose their piezoelectric properties, namely their ability to deform under the action of an electric field, in a similar manner to that of magnets, which lose their magnetic properties beyond the Curie point.

The inventor has found that this phenomenon of depolarisation occurs when, the piezoelectric component being on one of the branches of its hysteresis cycle, the value of the electric field to which it is subjected approaches a threshold situated on this branch at a certain distance from the value for which the polarisation is cancelled out. And the higher the temperature, the more this distance increases, and consequently the lower is the excursion domain available for subjecting the component to an alternating control voltage. The invention aims to obtain a piezoelectric motor remedying these drawbacks and functioning in a satisfactory manner over a wide power range, and therefore temperature range.

The object of the invention is a piezoelectric motor having:

a rotor having at least one disc rotating about an axis;

supply means for supplying an electric control voltage;

a stator having a set of at least one member for driving the disc in rotation, the drive member being able to be applied in a normal direction against the surface of the disc by a clutch member, and being able to be moved in a tangential drive direction by the deformation of at least one piezoelectric element able to be deformed whilst being subjected to a variation in the said electrical control voltage, characterised in that the said supply means are arranged to supply an electrical control voltage having a DC component of shifting towards the expansion state of the piezoelectric elements in the tangential direction.

Thus the invention makes provision for maintaining the piezoelectric elements in an operating zone where they keep their polarisation and a non-zero deformation. The variation in control voltage and the DC voltage are such that the polarisation of the piezoelectric elements remains greater than a non-zero threshold. According to one characteristic, the supply means are arranged to supply a DC component of the control voltage such that the control voltage keeps the same sign.

In order to obtain a greater margin of safety with respect to a depolarisation, the supply means are arranged to supply a DC component of the control voltage such that the control voltage is not cancelled out and its absolute value is greater than a strictly positive threshold. In order to isolate the DC voltage source producing the DC component of the control voltage with respect to the source producing the variable component of the voltage, the supply means are arranged to supply the DC component of the control voltage at a first terminal supplying voltage to the piezoelectric element by means of a decoupling inductor, and the first voltage supply terminal is connected, by means of a decoupling capacitor, to supplying voltage by the variable component of the control voltage. In order to compensate for the reactive energy generated by the piezoelectric element, an inductor is interposed in parallel with the piezoelectric element, on an input feeding by the variable component of the control voltage. In order to obtain a gain in voltage which is stable in a range of frequencies on the input feeding by the variable voltage component with respect to a variable voltage supply, the supply means are arranged to supply the variable component of the control voltage by means of a series LC circuit to this feeding input. According to one characteristic, the supply means are arranged to supply a variable component of the sinusoidal control voltage.

In an embodiment making it possible to increase the power of the motor, two piezoelectric elements are provided in front of and behind the drive member for its tangential movement. In a first particular embodiment, making it possible to optimise the power, the supply means are arranged to supply, to the piezoelectric elements of the drive member, variations in voltage which are substantially in phase opposition, for example with the same absolute values, and continuous voltage components substantially with the same sign, for example equal. The piezoelectric elements are then polarised in the same direction. In another particular embodiment, making it possible to use only one variable voltage source, the supply means are arranged to supply to the piezoelectric elements of the drive member variations in voltage which are substantially in phase, and for example equal, and DC voltage components of opposite sign, and for example with the same absolute values. The piezoelectric elements are then polarised in the reverse direction.

In a particular embodiment, improving the functioning of the motor, the stator has a complementary drive member on the other side of the surface of the disc, opposite the first drive member, and a member for prestressing the complementary drive member in the normal direction against the surface of the disc. In order to increase the power further, several drive members are distributed over the surface of the disc, the piezoelectric elements of adjacent drive members being connected together by a strut.

A particularly compact and powerful embodiment provides for the rotor to have a second disc coaxial with the first disc and for the stator to have a second set of drive members, at least one clutch member being provided between the two discs in order to apply at least the first and second drive members in opposite directions in the normal direction against the surfaces of the first and second discs. First and second complementary drive members are provided on the other side of the surface of the discs, opposite the first and second drive members and the prestressing members for the first and second complementary drive members in the normal direction against the surface of the discs. An inexpensive embodiment provides for the prestressing members to be formed by springs. The invention will be more clearly understood in the light of the following description made with reference to the drawings, given solely by way of example and in which:

DETAILED DESCRIPTION

Figures 1A, 1B, 1C:
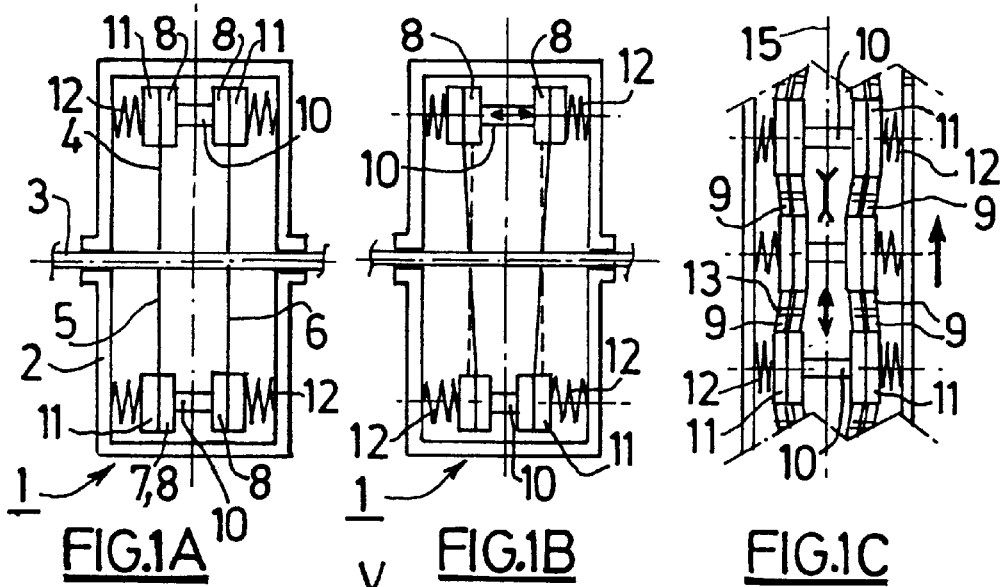
FIG. 1A is a schematic view in axial section of the piezoelectric motor according to the invention, at rest.
FIG. 1B is a schematic view in section of the piezoelectric motor in a state of functioning.
FIG. 1C is a developed schematic view of the piezoelectric motor.

In FIGS. 1A, 1B, 1C, the piezoelectric motor 1 has a casing 2 in which there is mounted, rotating with respect to an output shaft 3, a rotor 4. The rotor 4 has two discs 5, 6 coaxial with the shaft 3, fixed thereto and spaced apart from each other. In other embodiments which are not shown, a single disc is provided.

The stator 7 enclosed in the casing 2 has, close to the surface of the discs 5, 6, members 8 for driving these in rotation with respect to the shaft 3. The drive members 8 are moved in a direction tangential to the discs 5, 6 by piezoelectric elements 9 disposed against the surface of the drive members 8, at the front and rear in the tangential direction 15. The tangential direction 15 of movement of the drive members 8 is substantially parallel to the plane of the discs 5, 6, is not concurrent with the shaft 3 and is parallel to a longitudinal axis of the piezoelectric elements 9.

Clutch members 10 are provided on the drive members 8 in order to apply them in directions normal to the discs 5, 6 against the surface of the latter. In the embodiments presented, the members 8 driving the disc 5 and the disc 6 are provided facing each other in the directions normal to the discs 5, 6 and between them, and the clutch members 10 are provided in the space included between the facing drive members 8. Complementary drive members 11, able to be moved tangentially by piezoelectric elements 9, are provided on the other side of the discs 5, 6, facing the drive members 8. Springs 12 for prestressing the complementary drive members 11 towards the discs 5, 6 in the normal direction are provided between the casing 2 and these complementary drive members 11.

The control of the clutch members 10 is synchronised with that of the piezoelectric elements 9, so that, when the clutch members 10 cause a normal movement of the drive members 8 against the surface of the discs 5, 6, as depicted at the top in FIG. 1B, the piezoelectric elements 9 of these drive members 8 cause a movement in one direction in their direction 15 tangential to the discs, in order to drive the discs 5, 6 in rotation in this direction. On the other hand, when the clutch members 10 are controlled in order not to apply the drive members 8 against the discs 5, 6 or to decrease the distance between the facing drive members 8, the piezoelectric elements 9 are controlled so as to cause a movement of these drive members 8 in the other direction in the tangential direction 15, as depicted at the bottom in FIG. 1B.

The piezoelectric elements 9 are connected, at their end remote from their drive member 8, to a strut 13, itself connected to the piezoelectric element 9 for moving an adjacent drive member 8 or an adjacent complementary drive member 11, on each face of the discs 5, 6, as depicted in FIG. 1C. The drive members 8, 11 are thus distributed on the periphery of the discs 5, 6. The piezoelectric elements 9 and the clutch members 10 of adjacent drive members 8, 11 are controlled in alternation in normal separation of the members 8 and tangential movement thereof in a given direction and in normal moving together of the members 8 and tangential movement in the opposite direction, as depicted in FIG. 1C.

The discs 5, 6 have a certain flexibility in the normal direction in order to deform locally according to the pressure exerted by the drive members 8, 11. In embodiments which are not shown, a single disc 5 or 6 is provided on the rotor 4, as well as a single set of drive members 8 on one side of the disc and complementary drive members 11 on the other side of the disc.

Figure 2:
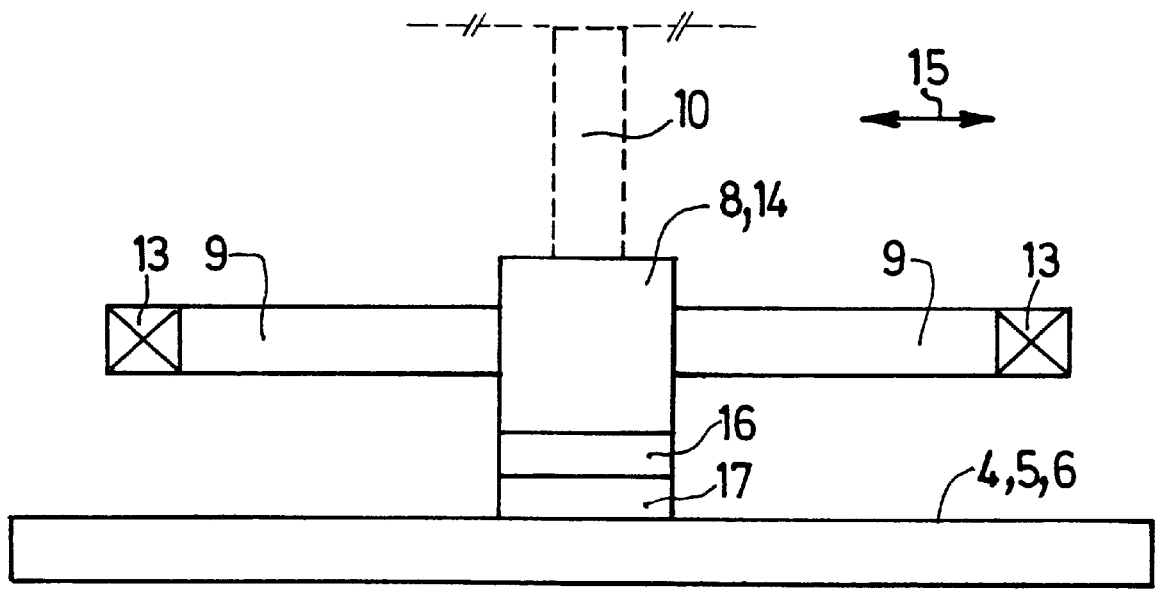
FIG. 2 is a schematic view in enlarged section of a member driving the stator.

In FIG. 2, the drive member 8 has a mass 14, on a normal face of which the clutch member 10 is applied and on the tangential faces of which there are respectively applied two piezoelectric elements 9 in the tangential direction 15. On the side turned towards the disc 5, the mass 14 is fixed to an elastic layer 16, itself fixed to a weight 17 having a tribological layer for contact with the surface of the disc 5, 6.

The piezoelectric elements 9 are controlled by a voltage having, in addition to the variable component intended to cause their variation in length in the longitudinal direction 15 in order to move the mass 14, a non-zero DC component. The DC component is such that it shifts the control voltage for the piezoelectric elements 9 in the direction of expansion thereof with respect to a zero voltage. Thus, under a zero variable component, the control voltage for the piezoelectric elements 9 is such that it causes a tangential expansion thereof with respect to their idle state.

Figure 3:
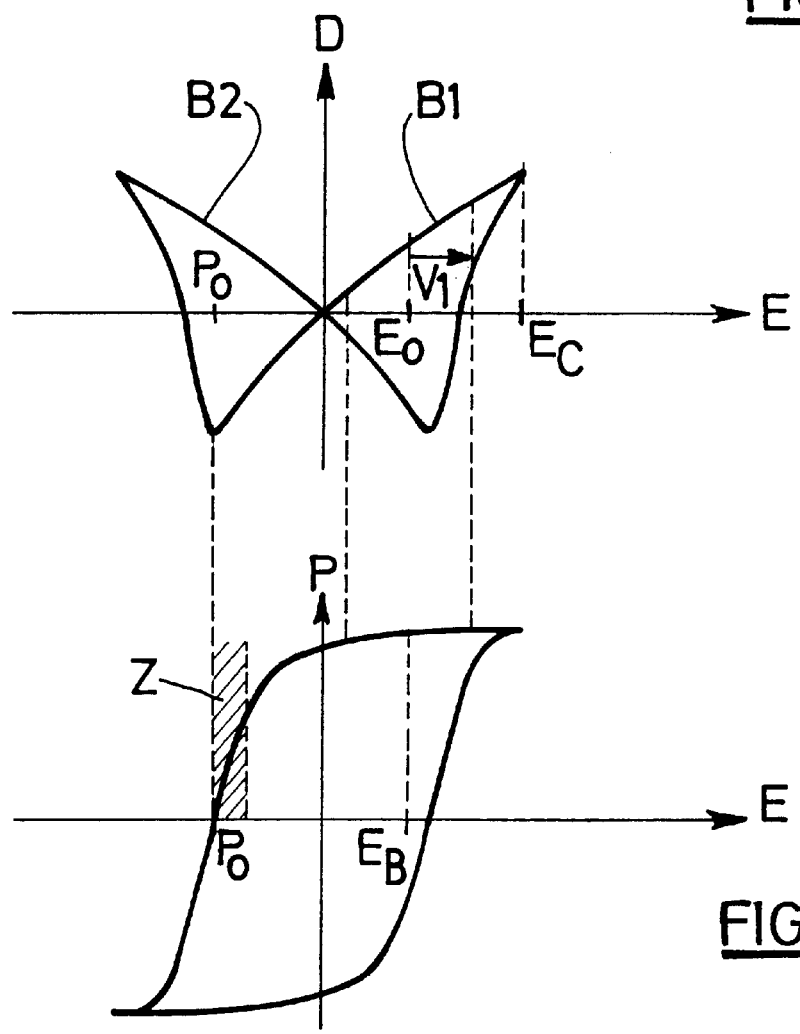
FIG. 3 shows a diagram of the deformation and polarisation of the piezoelectric element of the stator according to the electric field applied.

In FIG. 3, the DC component is for example such that the control voltage keeps the same sign, so as to cause a more or less great expansion of the piezoelectric element 9. The inventors perceived that there existed an area of loss of polarisation Z, depicted in hatched lines in the polarisation diagram P according to the electrical field applied E at the bottom of FIG. 3, having a tendency to extend in the direction of the vertical axis P when the temperature increases. The DC component $E_0$ corresponding to the continuous voltage component of the control voltage is situated in the box opposite to the zone Z.

The variable control voltage component is for example sinusoidal and the DC component $E_0$ is for example greater than the amplitude of the variable component. The control voltage remains below a breakdown voltage corresponding to a breakdown field $E_c$.

For a lead zirconate titanate piezoelectric element 9 having its axis 3—3 in the tangential direction 15, the polarisation cancellation point $P_0$ is situated at approximately 1500 V/mm with a deformation D of −0.12%. The width of the depolarisation band Z is for example 100 V/mm at 25° C. and approximately 1500 V/mm at the critical temperature of 320° C. The electrical breakdown field $E_c$ is for example 3500 V/mm for a deformation D of +0.12%. The DC component $E_c$ is for example +750 V/mm and the variable component of amplitude of 750 V/mm or less.

The control of the piezoelectric elements 9 by the same drive member 8 is effected in the same way as one expands more, whilst the other expands less. Under a zero voltage variable component, the piezoelectric elements 9 are all expanded by the continuous voltage component. Naturally, the DC voltage components can be different from one piezoelectric element to the other. In particular, the control voltage can be positive or negative according to the respective two branches B1 or B2 of the deformation curve D in FIG. 3.

Figure 4:
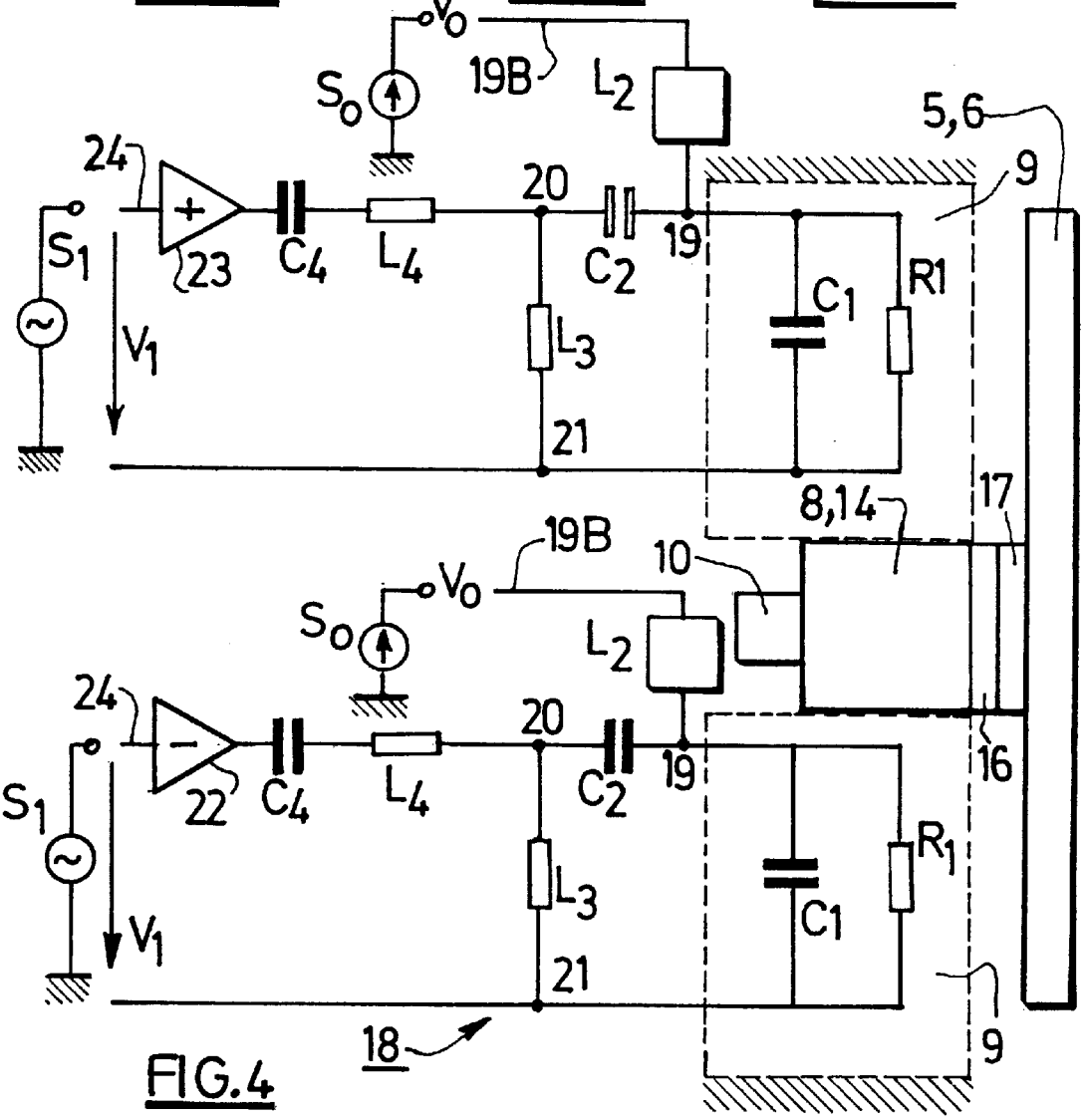
FIG. 4 is an electrical diagram showing the circuits supplying control voltage for a piezoelectric element.

In FIG. 4, each piezoelectric element 9 is modelled by a capacitor $C_1$ in parallel with a leakage resistor $R_1$, in the tangential direction. A circuit 18 supplying the piezoelectric element 9 with the control voltage comprises a decoupling inductor $L_2$ connected by one end to a first terminal 19 supplying voltage to the piezoelectric element 9 and connected by its other end to a first input 19B supplying DC voltage $V_0$ of the control voltage. A source $S_0$ supplying DC voltage $V_0$ is provided, which can be connected to the first DC voltage supply input 19B.

The first voltage supply terminal 19 is connected to a second variable voltage supply input 20 by means of a decoupling capacitor $C_2$. The second variable voltage supply input 20 is connected to the second voltage supply terminal 21 of the piezoelectric element 9 through an inductor $L_3$ for compensating for reactive energy generated by the element 9.

The second variable voltage supply input 20 is connected to one end of a series circuit LC, formed by an inductor $L_4$ in series with a capacitor $C_4$ and connected by its other end to an input 24 for supplying the variable component $V_1$ of the control voltage. The serial circuit $C_4$ $L_4$ forms, with the inductor $L_3$ and the capacitor $C_1$ of the piezoelectric element 9, a 4th order filter. The frequency spectrum of the variable voltage $V_1$ is for example such that it is situated in the substantially constant gain plateau of the filter. A source $S_1$ for supplying variable voltage $V_1$ is provided, able to be connected to the variable voltage supply input 24.

The piezoelectric elements 9 of a drive member 8 are for example controlled by variable components $V_1$ of voltage in phase opposition. In this case, input elements 22, 23 out of phase by 180° with respect to each other are for example interposed on the two inputs 24 supplied by the same source $S_1$ of variable voltage $V_1$. The same source $S_0$ supplying a DC voltage component $V_0$ is for example connected to the inputs 19B.

In a variant, the piezoelectric elements 9 of the same drive member 8 are fed with opposite DC voltages $V_0$ and by variable components $V_1$ of voltage in phase, and having an operating point respectively on the branches B1 and B2 according to FIG. 3. In this case, not shown, input elements out of phase by 180° with respect to each other are for example interposed on the two DC voltage supply inputs connected to the same source $S_0$ of DC voltage $V_0$ and the same source $S_1$ supplying a variable voltage component $V_1$ is for example connected to the variable voltage supply inputs.

The invention claimed is:

1. A piezoelectric motor comprising:
   a rotor having at least one disc rotating about an axis;
   a voltage supply source operably supplying an electric control voltage;
   a clutch member;
   at least one piezoelectric element; and
   a stator having at least one member operably driving the disc in rotation, the drive member being operably applied in a normal direction against the surface of the disc by the clutch member, and being movable in a tangential drive direction by the deformation of the piezoelectric element which is deformable while being subjected to a variation in the electrical control voltage;
   wherein the voltage supply source is arranged to supply an electrical control voltage having a DC component of shifting towards the expansion state of the piezoelectric element in the tangential direction.

2. A piezoelectric motor according to claim 1, wherein the voltage supply source is arranged to supply a DC component of the control voltage such that the control voltage keeps the same sign.

3. A piezoelectric motor according to claim 1, wherein the voltage supply source is arranged to supply a DC component of the control voltage such that the control voltage is not cancelled out and its absolute value is greater than a strictly positive threshold.

4. A piezoelectric motor according to claim 1, wherein the voltage supply source is arranged to supply the DC component of the control voltage to a first terminal supplying the piezoelectric element with voltage by a decoupling inductor, and the first voltage supply terminal is connected by a decoupling capacitor, to a supply input by the variable component of the control voltage.

5. A piezoelectric motor according to claim 1, further comprising an inductor interposed in parallel with the piezoelectric element on an input feeding by the variable component of the control voltage.

6. A piezoelectric motor according to claim 1, wherein the voltage supply source is arranged to supply the variable component of the control voltage at an input feeding the piezoelectric element by a series LC circuit.

7. A piezoelectric motor according to claim 1, wherein the voltage supply source is arranged to supply a sinusoidal variable component of the control voltage.

8. A piezoelectric motor according to claim 1, wherein two of the piezoelectric elements are provided in front of and behind the drive member for its movement in the tangential direction.

9. A piezoelectric motor according to claim 8, wherein the voltage supply source is arranged to supply to the piezoelectric elements of the drive member, voltage variations substantially in phase opposition, with the same absolute values, and DC voltage components with substantially the same equal sign.

10. A piezoelectric motor according to claim 8, wherein the voltage supply source is arranged to supply voltage variations substantially in equal phase, with DC voltage components of opposite signs, and with the same absolute values, to the piezoelectric elements of the drive member.

11. A piezoelectric motor according to claim 1, wherein the stator has a complementary drive member on the other side of the surface of the disc, opposite the first drive member, and a member for prestressing the complementary drive member in the normal direction against the surface of the disc.

12. A piezoelectric motor according to claim 11, wherein the prestressing members are springs.

13. A piezoelectric motor according to claim 1, further comprising:
   several drive members distributed over the surface of the disc; and
   a strut connecting together the adjacent piezoelectric elements of at least one of the drive members.

14. A piezoelectric motor according to claim 1, wherein:
   the rotor has a second disc coaxial with the first disc and the stator has a second set of drive members;
   at least one clutch member is provided between the two discs in order to apply to at least the first and second drive members, in opposite directions in the normal direction against the surface of the first and second discs; and
   first and second complementary drive members are provided on the other side of the surface of the facing discs of the first and second drive members and members for prestressing the first and second complementary drive members in the normal direction against the surface of the discs.

* * * * *